United States Patent [19]

Collar

[11] 3,980,209
[45] Sept. 14, 1976

[54] BULK LOADING PLASTIC COMPOUND DISPENSING DEVICE

[75] Inventor: Roland W. Collar, Sun Valley, Calif.

[73] Assignee: Roean Industries, Pacoima, Calif.

[22] Filed: May 16, 1975

[21] Appl. No.: 578,000

Related U.S. Application Data

[63] Continuation of Ser. No. 423,070, Dec. 10, 1973, abandoned.

[52] U.S. Cl. .............................. 222/323; 222/334; 222/389
[51] Int. Cl.² .......................................... B67D 5/46
[58] Field of Search ........... 222/334, 324, 323, 389, 222/383

[56] References Cited
UNITED STATES PATENTS

| | | | |
|---|---|---|---|
| 1,458,698 | 6/1923 | Greve | 222/389 X |
| 2,183,013 | 12/1939 | Davis | 222/389 X |
| 2,248,835 | 7/1941 | Hooydonk | 222/389 X |
| 2,692,706 | 10/1954 | Wiksten | 222/389 X |
| 3,254,806 | 6/1966 | Madsen | 222/389 X |
| 3,279,660 | 10/1966 | Collar | 222/389 X |
| 3,386,622 | 6/1968 | Cox et al. | 222/333 X |
| 3,565,287 | 2/1971 | Johnston | 222/249 X |

Primary Examiner—Stanley H. Tollberg
Assistant Examiner—Charles A. Marmor
Attorney, Agent, or Firm—William H. Pavitt, Jr.

[57] ABSTRACT

An air-powered gun adapted to be loaded with a plastic material such as a caulking compound from a bulk container thereof, and to dispense the same through a nozzle wherein the gun is comprised of a forward loading and dispensing barrel and an oppositely extending coaxial piston-driving rear air barrel, both of which barrels are held in back-to-back receptacles in a body gripping member provided with a handle. A piston slidable in the forward barrel is connected by a shaft to a piston in the rear barrel, which shaft extends coaxially through an orifice in the body gripping member passing through the bottom of both receptacles. Two plunger valves are provided in the handle, one to direct air into the receptacle for the forward barrel, and the other, to that for the rear barrel. A removable nozzled dispensing cap is provided for the outer end of the forward barrel. When the cap is removed and the uncovered forward barrel end is dipped into a container compound, actuating the valve to direct air into the receptacle for the rear barrel causes both pistons to move rearwardly to suck compound into the forward barrel thereby loading it. With the cap replaced, actuating the other valve to direct air into the forward barrel receptacle, drives both pistons forwardly in their respective barrels to extrude the loaded compound through the nozzled cap.

3 Claims, 7 Drawing Figures

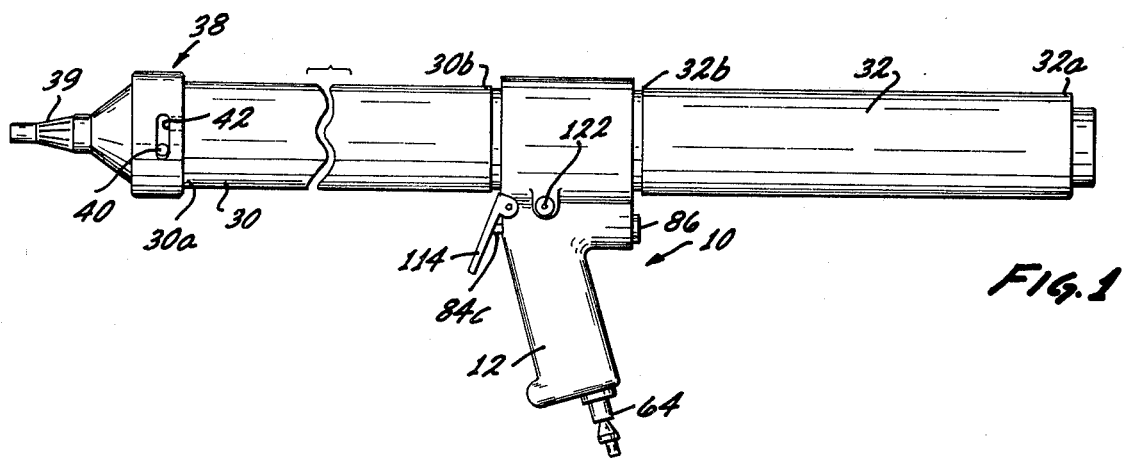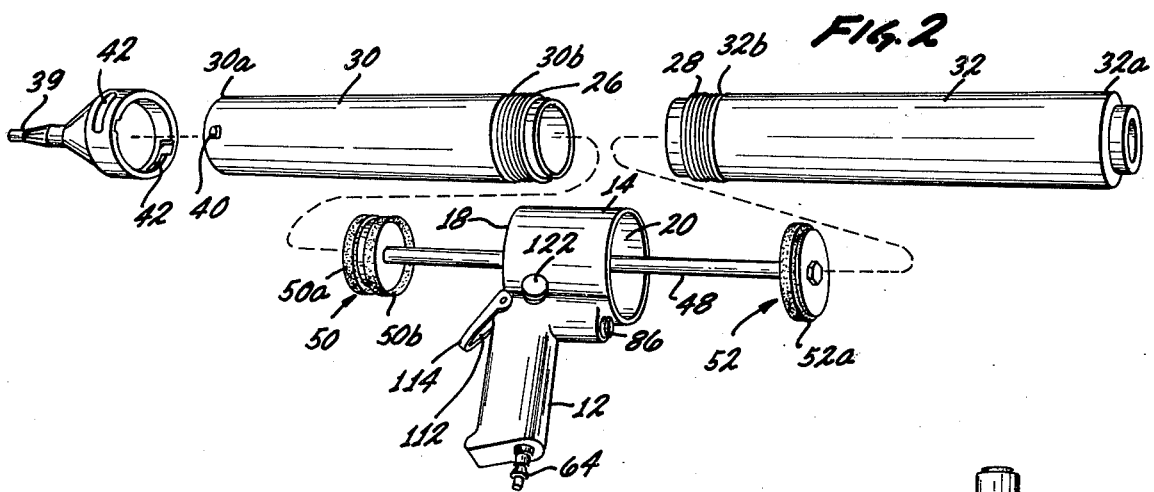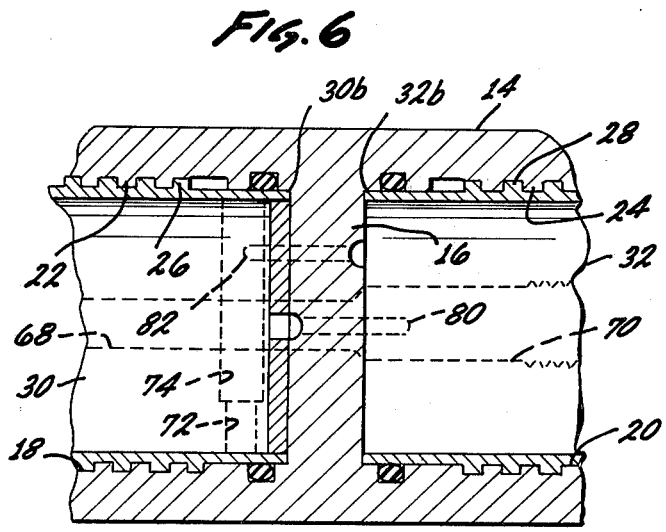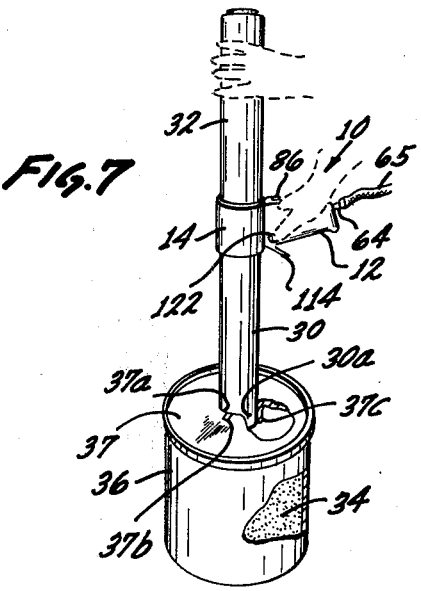

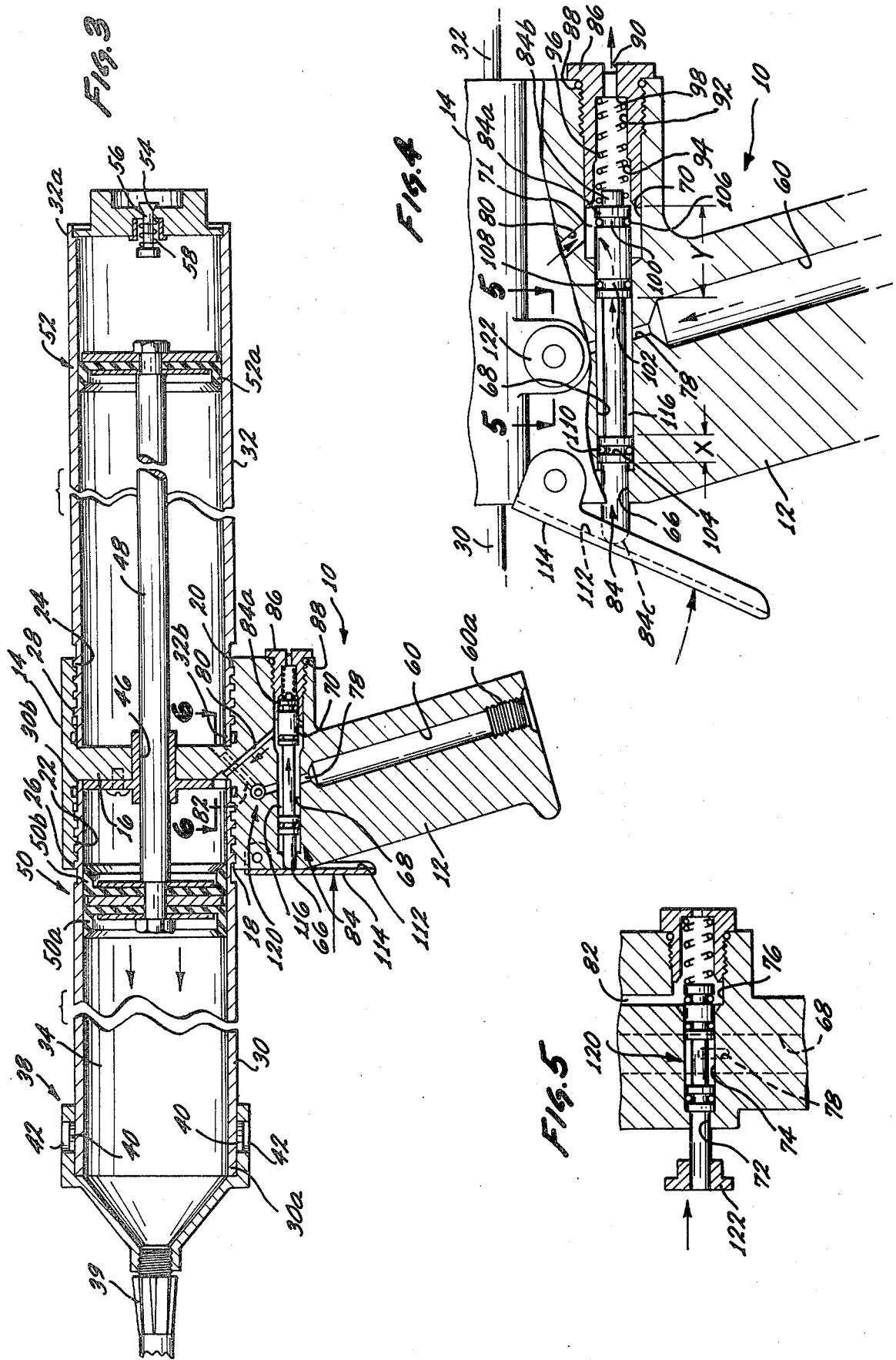

BULK LOADING PLASTIC COMPOUND DISPENSING DEVICE

This application is a continuation of application Ser. No. 423,070 filed Dec. 10, 1973, which application became abandoned May 27, 1975.

BACKGROUND OF THE INVENTION

1. Field of the Invention

This invention relates generally to air powered devices for dispensing a plastic or viscous material, and in particular to "guns" which can be loaded in situs from bulk materials and immediately dispensed.

2. Description of the Prior Art

Caulking guns to dispense plastic materials through nozzles have been extensively used — particularly since the manufacture of pressurized aircraft was first instituted. Within the last two decades, the techniques and equipment developed for aircraft caulking and sealing with polysulfides have been increasingly utilized in the construction industry.

Because the materials dispensed in sealing aircraft tended to "set up" relatively soon after they were dispensed, it was generally the practice to provide the materials in cylindrical plastic or cardboard cartridges which could be readily inserted in a sleeve-like barrel of the "guns" initially developed. These cartridges usually included a plastic piston which constituted a closure for the back end of the cartridge. Plastic nozzles of different sizes and configurations could be screwed on to the forward end of the cartridges.

Because the polysulfide or other material is quite tacky and sticks to almost any surface, then later quickly sets up as a rubber-like material, the practice in both the aircraft and construction industries has been to treat the cartridge containers, pistons and nozzles as throw-away items. They have not, however, been of such low cost that when many of them are used and discarded, the expense thereof may be ignored from an economic standpoint. In addition, it costs something to fill the cartridges from a source of bulk material. Moreover, if, after being filled, the cartridges are not used within a certain period of time — varying depending upon whether the materials are well or poorly sealed in the cartridges — the material may set up within the cartridge itself and thereupon become removable. This could be very costly as the material itself is not inexpensive.

The expense considerations have proven to be much more of a factor in the construction industry where far greater amounts of caulking compounds may be dispensed and building costs for a given size are not expected to compare at all with the costs of constructing a jumbo or even smaller military or commercial aircraft.

Within the last few years, therefore, some effort has been made to develop and market a gun which could be loaded in situ from a bulk container of a caulking compound. One such gun, known as the MONO Power Gun (Bulk) has been marketed by the Tremco Manufacturing Company of Cleveland, Ohio. This MONO gun, which bears only the number of a Danish patent NR 68-508 appears to be constructed in the manner disclosed in U.S. Pat. No. 3,254,806 issued June 7, 1966 to Niels Kirstein Madsen. The gun of this patent operates on the same principle as does the earlier caulking gun disclosed in U.S. Pat. No. 2,692,706 issued Oct. 26, 1954 to C. J. Wiksten and the earlier grease gun disclosed in U.S. Pat. No. 1,210,179 issued Dec. 26, 1966 to W. H. Lewis.

As far as can be ascertained, guns constructed in accordance with either the Madsen or Wiksten patent have not been widely used in the United States, despite the need for a gun which can be loaded from bulk containers of caulking compounds. Several reasons appear to account for the fact that such earlier guns have not been extensively used in the United States despite a pressing need for a bulk material loadable gun of this general type.

In the first place, they are expensive to manufacture.

Secondly, each has an intricate valving system operated by the single trigger which valving system appears to have been difficult to maintain in reliable operating condition, and, if the trigger should be inadvertently pushed in the wrong direction when the gun is being used to caulk, a suction may be created which could mar the bead of compound which is being extended and even collapse the plastic nozzle from which the material is being dispensed.

Thirdly, it is difficult to clean the gun after use. It is expected that, upon loading, the dispensing barrel will be sucked down into the bucket or can of compound to where it hits the bottom. This means that the entire outside of the barrel to the depth of the container will be covered with the compound and either must be wiped off immediately or it will get on the operator's hands and the swinging closure and even the surfaces adjacent the line where the caulking is in progress. The MONO gun has not thus, been very popular among workmen users.

In addition, if the gun must be disassembled, it is difficult to reassemble because of the intricacy of the valving system. Thus, in the case of the Madsen patent gun, since the handle is detachable from the socket piece and in reassembling it is necessary to properly align the three bores in the socket piece after two units are replaced and one hose connection is made. Thus, reassembly can generally be accomplished only by one who is quite knowledgeable of the Madsen gun details.

Further, because there is a vent hole in the Madsen gun which extends through the piston rod into the forward barrel where the caulking compound may line the inner wall, that vent hole may become clogged with the compound, particularly on the suction stroke.

BRIEF DESCRIPTION OF THE PRESENT INVENTION

The gun of the present invention obviates the problems which are inherent in the prior art guns by a novel and simplified construction which utilizes the same principle of the prior art of reciprocating pistons interconnected by a single shaft. The gun of the present invention also utilizes two barrels which extend coaxially in opposite directions from a central body gripping member. The latter has back-to-back receptacles removably to receive the two barrels, and preferably has an inteqrally formed handle extending downwardly from the central body gripping member. A piston in each barrel is connected by a coaxial piston rod to the piston in the other barrel. The rod extends slidably through the body gripping member. The handle is provided with a pressurized air inlet passage which may be connected into valve passages for two plunger valves disposed normally to each other, one to pass air to the receptacle for the forward (dispensing) barrel to drive the piston outwardly down that barrel; and the other valve being connected to pass air to the receptacle for the rear barrel to drive the piston outwardly down that barrel. Both valves are in venting or air bleeding condition when they are not being operated to pass air to their respective receptacles.

The dispensing valve may be operated by a conventional gun trigger, the loading valve, by a push button on the side of the gun handle.

The forward barrel is closed by a dispensing cap which may be coupled onto the end of the barrel by a bayonet type interlock. The rear barrel is closed at its outer end, except for a bleed hole in which an indicator element is loosely fitted to reciprocate therein.

In addition, an orificed plate may be provided to place on the rim of the bucket of bulk material. The size of the orifice may be such as to just pass through it the end of the forward barrel. Thereby, the plate may serve as a guide when the barrel is being loaded.

Since both barrels may be readily removed from the gripping member in the receptacles in which they are seated, each may be easily cleaned separately, to the extent required. Moreover, since the valve connections are made permanently into the receptacles, there is no problem reconnecting them when the barrels are replaced in the receptacles after cleaning.

In addition, each valve system is simple, but its actuation is designed to minimize the possibility of inadvertent operation. When the valves are not actuated, each receptacle is immediately vented to the atmosphere, thereby eliminating any undesired residual pressure in the receptacle. This feature eliminates further flow of the caulking compound from the nozzle on the forward barrel, and resistance to the return of the piston in the after barrel.

Because the gun may be manufactured as a series of separate parts with the handle and barrel body holding member cast as an integral unit and bored, the gun may be made and sold considerably more cheaply than the MONO gun.

Thus, the dispensing device or gun of the present invention may be seen to obviate the disadvantages of the prior art guns, and has already proven itself to be most popular among persons using such devices in the construction industry.

BRIEF DESCRIPTION OF THE DRAWINGS

FIG. 1 is a side elevation of the preferred embodiment of a gun of the present invention.

FIG. 2 is an exploded perspective view of the gun of FIG. 1.

FIG. 3 is an enlarged sectional view of the gun of FIG. 1.

FIG. 4 is an enlarged view partially in section of the lower part of the body gripping member and of the upper part of the handle of the gun of FIG. 3.

FIG. 5 is a section taken on the lines 5—5 of FIG. 4.

FIG. 6 is a section taken on the lines 6—6 of FIG. 3.

FIG. 7 is a perspective view of the loading system.

DESCRIPTION OF THE PREFERRED EMBODIMENT

A dispensing gun constructed in accordance with the present invention may comprise a body gripping member 10 which includes a handle 12 integrally formed with a cylindrical body 14. The body 14 is divided internally by a transverse wall 16 which, with the open ends of the cylindrical body 14, forms back-to-back a forwardly facing receptacle 18 and a rearwardly facing receptacle 20. Each of these receptacles 18,20 may be internally threaded at 22,24 respectively to receive the threaded ends 26,28 of sleeve-like barrels 30,32 respectively.

The forward barrel 30 extends a predetermined distance and is intended to be loaded with caulking compound 34 from a bulk container 36 as shown in FIG. 7. After being thus loaded, the end 30a of the barrel 30, is closed by a nozzled cap 38 which may be secured on the end 30a by a twist-type interlock comprised of projections 40 on the barrel end 30a and a pair of cam grooves 42 in the cap 38. Threading 26 on the end 30b of the barrel 30 enables the end 30b to be screwed into the receptacle 18. The rearwardly projecting barrel 32 is similarly threaded at 28 on its inner end 32b so that it may be screwed into the rearwardly facing receptacle 20.

The transverse wall 16 in the body 14 is axially orificed at 46 to permit a coaxial piston rod 48 to be slidably passed through the wall 16. As best seen in FIGS. 2 and 3, this rod extends for a distance substantially equal to the length of each of the barrels 30,32 and has a piston 50, secured on its forward end and another piston 52 on its after end. The latter piston 52 is circumferentially ringed with a sealing element 52a to prevent the escape of air when the piston is disposed in the barrel 32 and air under pressure is admitted into the receptacle 20 to force the piston 52 outwardly in the barrel 20. The other piston 50 is double ringed at 50a, 50b to prevent the escape of air around the circumference of the piston in either axial direction.

The outer end 32a of the barrel 30 is permanently closed except for an air escape orifice 54. Desirably an indicator element 56 may be provided to slide axially in the orifice 54, with a spring 58 biasing the element 56 to its innermost position in the barrel.

The body gripping member 10 is preferably cast as an integral unit and is orificed in several different directions. First the handle 12 is orificed at 60 to provide an air inlet passage as shown in FIGS. 3 and 4. The outer end 60a of this orifice may be threaded at 62 to provide for screwing on a base fitting 64 (FIGS. 1 and 2). A transverse bore 66 and counterbores 68,70, parallel to the axis of the cylindrical body 14, may be passed through the handle 12. A further series of transverse bore 72 and counterbores 74 and 76, the axis of which is normal, and is vertically displaced with respect to the axis of the bore 66 and counterlines 68,70, is also provided in the upper portion of the handle 12. Further passages are provided to interconnect the series of bores, counterbores and receptacles 18,20 as follows: A passage 78 extends from the inner end of the orifice 60 to the counterbore 68 and continues therethrough to the counterbore 74. A passage 80 extends from the counterbore 70 to the inside of the receptacle 18. A further passage 82 extends from the counterbore 76 to the inside of the receptacle 20.

Valving means are provided in each of the two series of bores and counterbores as follows:

As shown in FIGS. 3 and 4, a plunger-type valve 84 is slidably disposed in the bore 66 and counterbores 68 and 70. A threaded centrally orificed plug 86, however, is first inserted from the after side of the upper portion of the handle 12 into the counterbore 70 and is peripherally sealed therein by an O-ring 88. The orifice 90 in the plug 86 is also counterbored twice at 92,94. A coiled spring element 96 may be seated on the shoulder 98 where the orifice 90 and counterbore 92 join. The counterbore 94 is of a diameter sufficient slidably to receive the end 84a of the plunger valve 84. Such end, however, desirably may be reduced at 84b for a short distance to be insertable within the coil spring 96. The valve 84 may be circumferentially grooved at 100,102 and 104 to receive respectively, sealing O-rings 106,108 and 110. The diameter of the plunger valve 84 is greater over each of the axial lengths X and Y so as to slide in a close fit in the counterbore 68. It is along these axial lengths X and Y that the grooves 100,102 and 104 with their respective O-rings 106,108 and 110 are disposed. The forward end 84c of the plunger valve 84 projects out of the bore 66 and may be rounded slidably to be actuatible by the cam groove 112 in a trigger 114. It will be seen that with this plunger valve arrangement a circumferential passage 116 is provided about the plunger 84 between the axially extended portions X and Y of greater diameter.

A somewhat similar valving arrangement 120 (FIG. 5) may be provided in the transverse series of bore 72 and counter bores 74,76, except that instead of having the end 84c of the plunger valve 84, a single thumb button 122 may be provided. Because of the great similarity in construction and operation between the plunger valves 84 and 120, it should not be necessary to describe in detail what is clearly shown in FIG. 5.

In operation, the gun is first loaded by removing the nozzled cap 38 and inserting the end 30a of the barrel 30 through an orifice 37a in a special lid 37 which is placed on, and supported by, the rim of the can 36 of bulk caulking compound 36 as shown in FIG. 7. The portion of the lid 37 which defines the orifice 37a should be notched at 37b to permit the barrel end projections 40 to pass through lid orifice 37a with the barrel end. Desirably also, on the underside of the lid 37 around the orifice some type of downwardly projecting guides 37c may be provided in order to maintain the barrel in a perpendicular orientation with respect to the lid 37.

With the fitting 64 connected to an air hose 65 from a source of air under pressure (not shown) and with the pistons 50 and 52 disposed in their forward-most positions in their respective barrels 30,32, when the operator depresses the button 122 to push the plunger 120 into the bore 72 and counterbores 74,76, air under pressure which is in the circumferential chamber 124, having passed into that chamber through the bore 78 and chamber 116, is diverted into the passage 82 through which it enters the rear receptacle 20, and thereby drives the piston 52 rearwardly and outwardly toward the end 32a of the barrel 32 until it strikes the end of the indicator 56. When the indicator 56 is thus struck by the piston, it is pushed out to let the operator known that the piston 52 has reached the end of its stroke so that he should release the button 122.

As the piston 52 is thus driven down its barrel 32, it draws with it through the rod connection 48 to the piston 50, the latter piston back up its own barrel 30, thereby creating a low pressure in the barrel 30. Atmospheric pressure on the surface of the caulking compound 34 then forced compound into the barrel to fill the same. The thus-filled barrel 30 is then withdrawn from the lid covered can and after its end 30a is wiped clean, the nozzled cap 38 is put on such barrel end, and twisted to lock it thereon. The gun is now ready for caulking and may be used simply by putting the end of the nozzle 39 against the surface to be caulked and pulling the trigger 112. As the trigger is thus pulled, the plunger 84 is moved rearwardly (to the right in FIGS. 3 and 4), ultimately to where the chamber 116, which has air under pressure from the bore 78 and counterbore 60 in communication with the air hose 65, is placed in communication with the air passage 80. Simultaneously, the end 84b of the plunger valve 84 is moved into the counterbore 94 sealingly to close off communication between the annular chamber 71 and the venting orifice 90. When air under pressure enters the passage 80, it is delivered to the forward receptacle 18 whereupon it drives the piston 50 down the barrel 30 to extrude through the nozzle 39 the caulking compound which has been loaded into the barrel 30 in the manner heretofore described. The spring biased indicator 56 opens the orifice 54 to allow air from outside to enter the after end of the barrel 32 as soon as the piston 52 is carried back forwardly in the barrel 32 by the shaft 48 connected to the forward piston 50, thereby preventing the development of a low pressure in the barrel 32.

As soon as the trigger is released, however, so that the valve plunger 84 is forced forwardly by the spring 96, the chamber 71 and passage 80 are again placed in communication with the vent 90 so that any residual air pressure in the receptacle 18, passage 80 and chamber 71 is immediately dissipated to the surrounding atmosphere. Sucn immediate dissipation is most important if continued extrusion or "after flow" of the plastic compound is to be prevented.

From the foregoing description of the illustrated embodiment of the invention, it may be seen that the present invention obviates the principal problems encountered with the MONO gun and provides an inexpensive, practical and easily maintainable bulk loading plastic compound dispensing gun.

After the barrel 30 has been fully emptied by driving the piston 50 to the end of its stroke in the barrel, the gun is ready for re-loading in the manner first hereinabove described.

To clean the gun, it is usually necessary only to unscrew the forward barrel 30 and remove it entirely. However, if desirable, one may also remove the rear barrel 32 for cleaning, and possible for blowing out all air passages. Reassembly of the gun may be simply accomplished by placing the barrels over their respective pistons and pushing them back toward their receptacles where they are screwed into place.

I claim:

1. In an air powered gun adapted to be loaded with a plastic material such as a caulking compound from a bulk container thereof, and to dispose the same through a nozzle, said gun comprising:
   A. A body gripping member, said member including first and second coaxial oppositely facing cylindrical receptacles, each of said receptacles being closed at one end and open at its other end, with their closed ends being disposed back-to-back to constitute a transverse wall, said wall having a coaxial orifice therethrough, and a handle extending radially from one side of said member and attached thereto;
   B. A first cylindrical barrel, one end of which is insertable in the first of said receptacles for interlocking engagement therein, said barrel having interlocking means at its other end;
   C. A removable dispensing cap including a nozzle, said cap fitting over the said other end of said first barrel and having means cooperating with said interlocking means to enable said cap to be removably secured on said other end of the first barrel;

D. A second cylindrical barrel one end of which is insertable in the second of said two receptacles for interlocking engagement therein, the other end of said second barrel being closed except for a small air relief orifice;

E. A first piston reciprocally slidable axially in the said first barrel;

F. A second piston reciprocally slidable axially in said second barrel;

G. A piston rod secured to said first piston and extending coaxially from said first piston in its position closest to said transverse wall slidably through the orifice therein, and secured to said second piston in its position most distant from said transverse wall;

An improved valving system in the handle and remainder of said body gripping member, said system comprising:

i. an air inlet passage connectable at the handle to an outside source of air under pressure and extending in at least a partial radial direction toward the common axis of the cylindrical receptacles;

ii. a first bore extending through the upper part of the said handle and transversely intersecting said air inlet passage, said first bore having a forward end through the leading edge of the handle, and an after end through the rear edge of the handle, said first bore being threaded and plugged by an axially orificed threaded fastening means at the after end of the first said bore and being of smaller diameter at its forward end;

iii. an air passage connecting said first bore to the first receptacle, iv. first valve means slidable in said first bore and at least partially into the axial orifice in said threaded fastening means, and being actuable by the application of pressure from outside of said handle, said valve means being slidable from a first position wherein communication between said first bore and said air inlet passage on the one hand and said first receptable through said air passage on the other hand is blocked, and said first receptacle is vented to the atmosphere through said air passage and the orifice in said fastening means, to a second position wherein such venting is blocked and said air inlet passage and said bore are placed in communication with said first receptable through said air passage, thereby admitting air under pressure into said first receptacle to force said first piston down the first barrel toward the dispensing cap; said first valve means having an actuating stem projecting from the unplugged end of the first bore;

v. first spring means seated in said axial orifice in said threaded fastening means to bias said first valve means into said first position in the absence of the application of force applied externally to said projecting actuating stem;

vi. a second bore extending through the upper part of said handle transversely to both said air inlet passage and said first bore and displaced vertically from the latter, said second bore being threaded and plugged by an orificed threaded fastening means at one end thereof, and of a smaller diameter at its other end thereof;

vii. first air passage means connecting said air inlet passage to said second bore, viii. second air passage means connecting said second bore to the said second receptacle; and ix. second valve means, said second valve means being slidable in said second bore and actuatable by the application of pressure from outside said handle, said second valve means further being slidable from a first position wherein communication between said second bore and said first air passage means on the one hand and said second receptacle through said second air passage means on the other hand is blocked, and said second receptacle is vented to the atmosphere through said second air passage means and the orifice in said fastening means, to a second position wherein the last said venting is blocked and said first air passage means is placed in communication with said second air passage means, thereby admitting air to said second receptacle to force said second piston down the second barrel towards its closed end; said second valve means having an actuating stem projecting from the unplugged end of the second bore; and x. second spring means seated in the axial orifice in the threaded fastening means plugging said second bore to bias said second valve means into its said first position in the absence of the application of force applied externally to the actuating stem projecting from the unplugged end of the second bore; and xi. means whereby each of said projecting valve actuating means may be pushed into its respective bore to slide the valve means therein to its respective second position.

2. The improved valving system as described in claim 1 wherein an indicator element is disposed in the relief orifice in the closed end of the second barrel and is slidable axially therein.

3. The improved valving system as described in claim 1 wherein each valve means is actuatable by a movable member projecting outwardly from the handle, that for the receptacle for the first barrel being in the form of a trigger disposed for fingering forward of the handle, and that for the receptacle for the second barrel being in the form of a push button on the side of the handle.

* * * * *